Aug. 7, 1934.　　　　E. C. RANEY　　　　1,969,326
REFRIGERATOR TEMPERATURE CONTROL
Filed Sept. 21, 1933　　　2 Sheets-Sheet 1
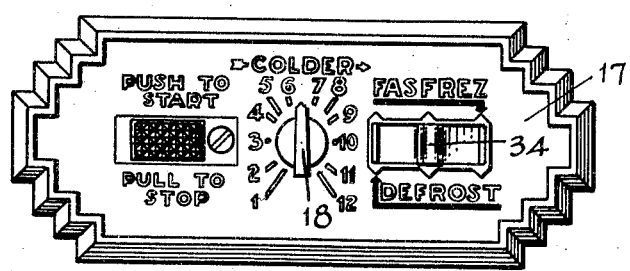
Fig 2
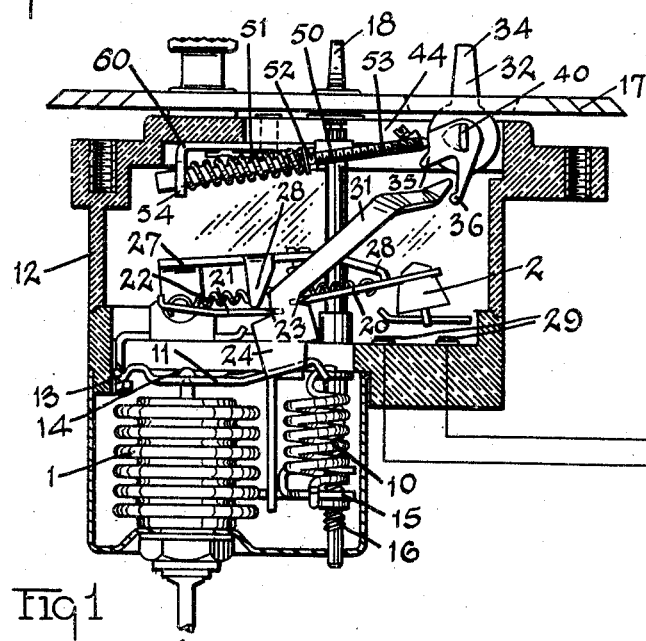
Fig 1
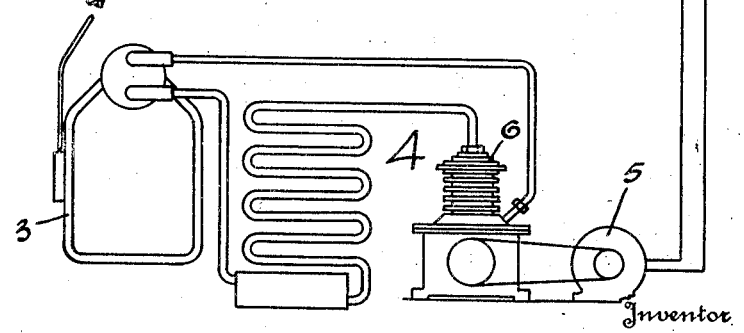
Inventor
Estel C. Raney
By Faust F. Crampton
Attorney

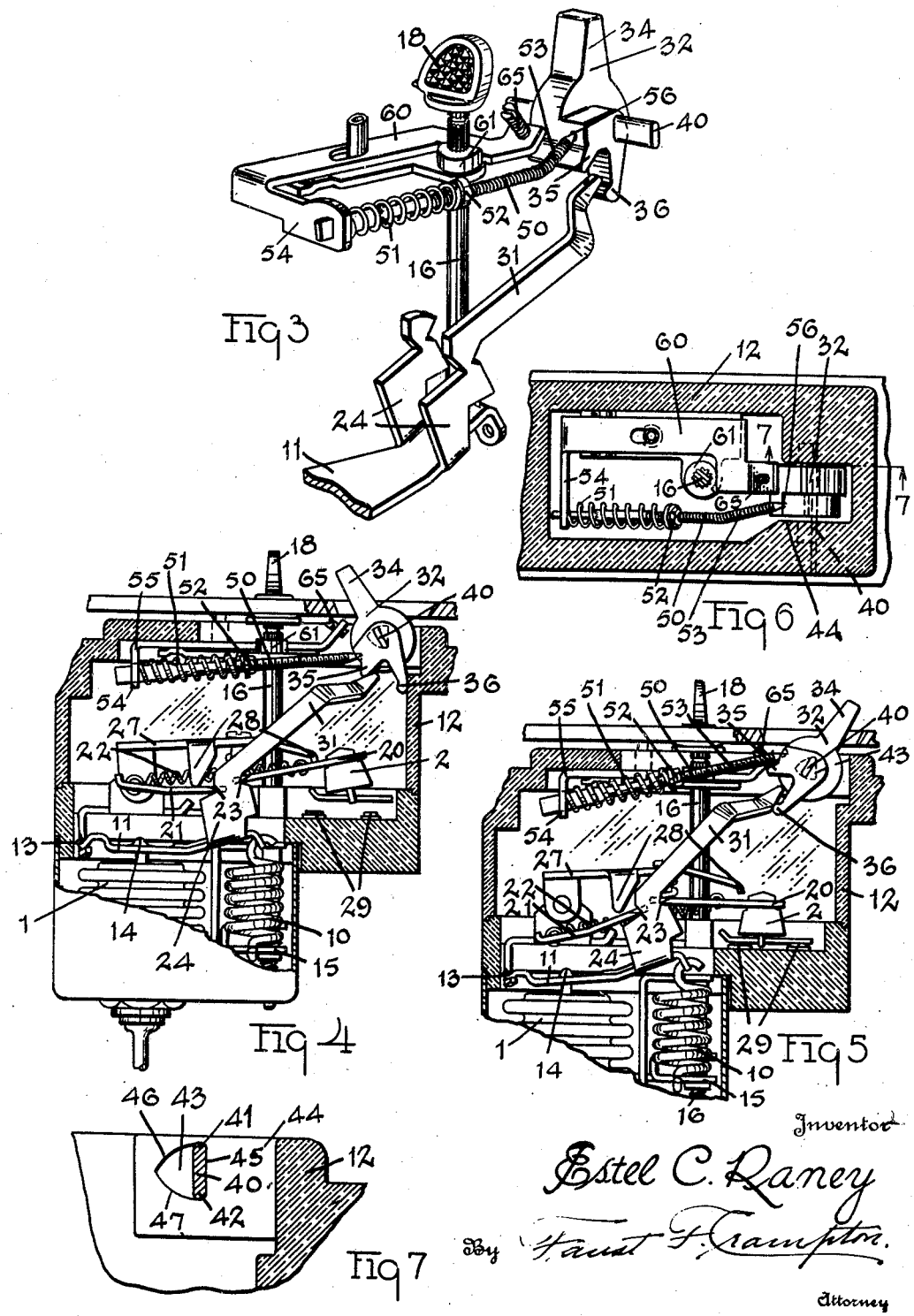

Patented Aug. 7, 1934

1,969,326

UNITED STATES PATENT OFFICE 1,969,326

REFRIGERATOR TEMPERATURE CONTROL

Estel C. Raney, Columbus, Ohio, assignor to The Automatic Reclosing Circuit Breaker Company Application September 21, 1933, Serial No. 690,452

15 Claims. (Cl. 200—83)

My invention has for its object to provide a control device for refrigerating apparatus wherein an automatic control mechanism operates to regulate the refrigerating apparatus to produce desired normal or ordinary refrigerating temperatures according to its adjustment and which may be readily altered to produce a marked predetermined lower or fast freezing temperature or altered to produce a marked predetermined higher temperature to cause defrosting of the chilling unit of the refrigerating apparatus, and in either case automatic restoration of the control device is made subsequently to produce the adjusted normal or ordinary refrigerating temperatures. In order to produce the predetermined or substantially fixed high or low temperatures and provide for variation of the normal refrigerating temperatures, the adjusting mechanism of the control device compensates for the difference between the cut-in temperature when in normal operation, and the cut-in temperature at the predetermined high temperature when or after defrosting has been completed, and also the difference between the cut-out temperature when in normal operation and the cut-out temperature when the predetermined low or fast freezing temperature has accomplished the result desired. The invention provides an exceedingly simple and efficient thermic or pressure responsive switch for producing either the desired predetermined low, or fast freezing, or the predetermined high, or defrosting, temperatures, irrespective of the relatively low or high normal refrigerating temperatures to which the control device may be adjusted. The construction thus avoids a variation in the fast freezing temperature or in the defrosting temperature that would otherwise be caused by variation in the normal refrigerating temperature. The invention insures the economic operation of the refrigerating apparatus by an exact control of the defrosting and fast freezing temperatures regardless of the manual variation of the control to produce the different normal operating temperatures.

The invention may be contained in switches of different forms, and to illustrate a practical application of the invention, I have selected a control device that contains the invention as an example of the various structures that embody the invention and shall describe the thermo-responsive switch selected hereinafter. The particular switch referred to is illustrated in the accompanying drawings.

Fig. 1 illustrates a section of the control switch and shows diagrammatically a refrigerating apparatus. Fig. 2 illustrates a top view of the control device, or more particularly, the face plate of the device. Fig. 3 illustrates a perspective view of parts of the control device and shows the said parts located in relative positions to produce normal refrigerating temperatures. Fig. 4 is a view of a section of the control device and illustrates parts of the control mechanism in positions such as to produce a predetermined defrosting temperature. Fig. 5 is a view similar to that shown in Fig. 4 and shows parts of the mechanism in positions such as to produce fast freezing temperature. Fig. 6 illustrates a view of a transverse section showing a top view of a part of the device. Fig. 7 illustrates a view of a section taken on the plane of the line 7—7 indicated in Fig. 6 and illustrates a bearing socket formed in each of the two side walls of a slot formed in the end of the shell containing the parts of the control device.

The actuating element of the control switch is of a type common in connection with refrigerator controls, wherein an elastically resisted expansion device is operated either by the pressure of refrigerant gas in some part of the refrigerating apparatus or by the pressure of a gas thermically responsive to the temperature of some part of the refrigerator. The pressure device produces intermittent or cyclic operation of the refrigerator to maintain a desired temperature in the cooling chamber. Thus the spring pressed bellows 1 is responsive to variations in temperature produced by the evaporator 3 of the refrigerating apparatus 4 and is operatively connected to a switch 2 to open and close the circuit of the motor 5. When the switch 2 is closed, the motor 5 operates the compressor 6 to reduce the temperature of the refrigerator, and when the temperature has reduced to a certain point, the bellows 1 contracts sufficiently to open the switch, and the compressor 6 ceases in its operation. As is well known, the refrigerating apparatus continues in its cycles of operations to maintain the desired temperature in the refrigerating chamber according to the adjustment of the control device. The control device is adjusted by adjustment of the pressure of the spring that counteracts the expansive movement of the bellows.

The switch 2 is so connected to the bellows as to operate either to cut out or cut in the motor when the bellows 1 has reached predetermined points in its expansive or contractive movements, and hence, to raise the temperature at which the switch is closed, the resistance of the spring to the expansion movements of the bellows 1 is increased, and to lower the temperature at which the switch is opened, the tension of the spring 10 is decreased. In order to produce a high temperature for defrosting purposes, it is consequently necessary to increase the load on the bellows to resist additionally its expansive movement, or to produce a fast freezing temperature, it is necessary to reduce the resistance to the expansive movement of the bellows in order that the switch 2 may be operated to close or open at the definite points in the expansive or contractive movements of the bellows. Also, to produce a predetermined fast freezing temperature or a predetermined defrosting temperature, notwithstanding variations in adjustment of the control device to produce different normal operating temperatures, compensation for the adjustment of the spring 10 is provided for. Otherwise the excessive lower or higher temperatures will be varied according to the adjustment to produce lower or higher normal refrigerating temperatures.

In the form of construction shown, the bellows 1 operates upon a lever 11 that is suitably anchored to the shell 12, as at 13, and is engaged by the bellows, as at 14, and is connected to the spring 10 at its outer end. The spring 10 is connected to a suitable threaded plate 15 located on a threaded rod 16 and adjustably movable by rotation of the rod 16 to vary the tension of the spring 10. The rod 16 extends through the face plate 17 and is connected to a suitable dial pointer 18, movable over a dial that may be formed on the face plate 17 to indicate the positions to which the rod 16 is turned by the dial pointer 18 and consequently to indicate the adjustments of the bellows 1 made by the changes in the tension of the spring 10.

The switch arm 20 of the switch 2 forms one of the elements of a toggle and is connected to the other element 21 of the toggle by means of a spring 22. The spring 22 operates to draw the elements 20 and 21 into notches 23 formed in a yoke or bifurcated part 24 of the lever 11. The elements 20 and 21 are formed U-shaped to allow for free movement of the joint of the toggle formed by the notches 23 and the spring 22 relative to each other. Suitable stops are provided for limiting the movements of the elements 20 and 21 of the toggle. A bar 27 may be adjustably located with reference to the switch and provided with suitable fingers 28 disposed to limit the upward movement of the elements of the toggle switch. The contacts 29 limit the closing movement of the switch arm 20, and the bottom wall of the shell, or other suitable stop, may be used for limiting a similar movement of the element 21.

In order to vary the resistance to the expansion of the bellows 1 to produce the marked alteration in the operation of the refrigerating apparatus to produce either fast freezing at a predetermined low temperature or defrosting at a predetermined high temperature, means is connected to the lever 11 to add to or subtract from the load produced by the tension of the spring 10 in amounts that are adjusted according to the adjustment of the tension of the spring 10 when adjusted to produce desired normal refrigerating temperatures.

The lever 11 is provided with an arm 31, and a spring pressed, manually operable control member 32 is disposed with reference to the arm 31 to permit response of the control device to the adjustment of the spring 10 to produce normal refrigerating temperatures, or it may be so disposed as to press the arm 31 in one direction to aid the spring 10 in its counteraction on the bellows 1 to produce a defrosting temperature or it may be so disposed as to press the arm 31 in an opposite direction to reduce the counteracting pressure on the bellows 1 to produce a fast freezing temperature. In either case the control member 32 is adjusted by the dial pointer to adjust the pressure of the control member 32 on the arm 31 to cause the pressure to vary according to the adjustment of the tension of the spring 10 to produce the desired normal refrigerating temperature.

The variation of the pressure of the control member 32 on the bellows may be accomplished by alteration of spring adjustment, or by variation of the extent of permissible angular movement of the control member 32 to vary the extent of the return or restoration movement, or by changing the angular relation of the control member and the arms 11 to vary the mechanical advantage for accomplishing the restoration of the control member 32 by the arm 11, or by the use of a combination of one or more such methods to obtain the required adjustable resistances to restoration of the control member and which are dependent in their adjustments upon the degree of adjustment of the control device to obtain the desired normal refrigerating temperatures.

In the form of construction shown, the member 32 is pivotally supported in the shell 12 and is provided with a finger 34 that protrudes through the face plate 17 for operation of the control member 32. It is thrown to the right or to the left according to whether it is desired to produce sufficiently high temperature to defrost or a sufficiently low, fast freezing temperature. The control member 32 is provided with a pair of arms 35 and 36 that project to points located on opposite sides of the end of the arm 31 of the lever 11 and angularly separated from each other sufficiently to permit movement of the arm 31 between the arms 35 and 36 during the normal temperature production of the refrigerating apparatus and without engagement of the arm 31 by either of the arms 35 or 36.

The control member 32 is spring pressed and so supported as yieldingly to resist movement from any one of the three positions to which it may be turned, that is, the neutral, fast freezing, or defrosting positions. In order to produce the fast freezing, the control member 32 is rotated to the right to cause engagement between the ends of the arms 31 and 36. The arm 36 operates to raise the arm 31 and consequently opposes the tension of the spring 10 and aids the bellows 1 in the movement of the lever 11, or, in other words, it reduces the load on the bellows and causes opening of the switch 2 at a much lower temperature than that of the normal operating temperature as determined by the adjustment of the spring 10. When it is desired to defrost, the control member 32 is thrown to the left, and the arm 35 engages the arm 31 on the opposite side of the arm and so as to increase the load on the bellows 1, and cause closing of the switch at a higher temperature since the control member 32 thus coacts with the tension of the spring 10 to resist the expansive movement of the bellows 1. If, when the load is added to the bellows, the switch should be closed by rotation of the member 32, it will be immediately opened;

and if the switch should be open when the load is reduced, it will be immediately closed.

To obtain the difference in the load that is added to produce defrosting and the load that is subtracted to produce fast freezing, the parts are so formed as to produce the required difference in resistance to movement of the control member 32 by the lever 11. Thus the arms 35 and 36 may have different lengths or shapes, and the end of the arm 31 may be shaped to give different mechanical purchasing powers to cause return movement of the member 32.

In the form of construction shown in the drawings, the control member 32 is provided with a flat bearing rod 40. The rod protrudes into sockets 43 formed in the side walls of the slot 44 located in the upper end of the shell 12. The rod 40 is preferably provided with rounded edges 41 and 42, particularly where it is located within the recesses or sockets 43 formed in the side surfaces of the slots 44. The control member 32 is located in the slot 44, and the bearing rod 40 is inserted endwise through the bearing member, and so as to locate the ends of the rods in the sockets 43, and connect the control member 32 to the bearing rod 40. The bearing rod moves angularly in the sockets and limits the angular movement of the control member. The sockets 43 have flat sides 45 and curved sides 46 and 47. The sides 46 and 47 conform substantially to the curvature produced by rotation of one edge of the bearing rod 40 about the other of its edges. Thus the bearing bar may be rotated on its rounded edge 42 to describe by the edge 41 substantially the arc of the surfaces of the sides 46, or it may be rotated on the edge 41 to describe by the edge 42 substantially the arc of the surfaces of the sides 47. Also, by reason of the fact that the center of rotation of the member 32 varies by reason of the fact that when in one position its center of rotation is at the edge 41 and when in the other position the center of rotation is at the edge 42 of the bearing bar, the effective lengths of the arms 35 and 36 are varied by an amount equal to the width of the bearing bar 40, producing the corresponding change in resistance to rotation of the member 32.

A rod 50 is spring pressed by means of a spring 51 against the member 32 and in a direction to force the member 32 and the bearing bar 40 against the plane surfaces 45 of the sockets 43. This operates normally to press the flat bearing rod 40 against the plane surfaces 45, and rotation of the bearing member in either direction is yieldingly resisted until it is sufficiently rotated to change the line of pressure so that the line of pressure will pass to one side or the other of the surfaces 45. The control member 32 will thus be held in either of these positions by the spring 51 until it is again restored by reverse pressure to its normal position.

The pressure of the spring 51 may be adjusted by means of a nut 52, the rod 50 being provided with a threaded portion 53. The spring 51 surrounds a part of the rod and abuts against the washer that is held by the nut 52 and against an arm whose position may be adjusted. Preferably the end of the rod 53 is pointed and engages in a recess 56 formed in the control member 32 at a point sufficiently remote from the bearing bar as to shift the line of direction of pressure exerted through the rod 50 to above or below the areas of the surfaces 45 when the control member is rotated, and thus will operate yieldingly to hold the control member 32 either in a position such as to enable the control device to cause the refrigerator to produce normal refrigerating temperatures, or a position to produce defrosting of the refrigerator, or in a position to produce fast freezing, and, in any case, the spring 51 operates to resist the return movement of the control member 32 to its normal position. Thus the return movement of the control member 32 by the operation of the bellows 1 is resisted by the spring 51, either to close the switch when the member 32 is turned to the defrosting position, or to open the switch when the member 32 is turned to the fast freezing position.

To provide for variations in the resistance of the member 32 to rotation, according to the adjustment of the control for producing desired normal operating temperatures, the resistance to rotation of the control member is correspondingly varied, whether the rotation is made to the normal position of the control member from the defrosting position or from the fast freezing position. In order to produce the corresponding variation in the resistance to return rotation of the member 32, the arm 54 is supported on a slidable frame 60, and a cam 61 is adjustably connected to the rod 16 and in position to engage the edge of the projecting part of the frame 60 and so that the pressure of the spring 51 operates to hold the said edge of the frame against the edge of the cam 61. The cam 61 may be designed to have a contacting surface of the desired contour and such that rotation of the cam 61 by rotation of the rod 16 will move the frame 60 so as to increase or decrease the pressure of the spring 51 the required amounts, to compensate for the adjustment of the spring 10 to produce substantially the same predetermined fast freezing temperature or substantially the same defrosting temperature, irrespective of the adjustment of the spring 10. Thus the shape of the cam 61 is such that when the spring 10 is decreased in its effective pressure on the bellows by rotation of the dial pointer to produce a lower normal temperature, pressure of the spring 51 is increased, and the reverse occurs when the dial pointer is rotated to produce a normal warmer temperature.

When the dial pointer is rotated to produce normal low refrigerating temperature, there is less difference between the normal low temperature and the predetermined fast freezing temperature than when the normal operating temperatures are higher. While to defrost at a predetermined temperature when the control is set for a low normal temperature, there is a greater temperature difference than when the normal refrigerating temperature is higher, and consequently the increase in the resistance to restoration must be correspondingly greater.

In order to vary the resistance to return of the member 32 to the normal, suitable limiting stops that are adjusted according to the rotation of the rod 16 may be provided for limiting the extent of movement of the member 32. In the form of construction shown, an adjustable stop pin 65 is supported on the frame 60 and is located with respect to the outer surface of the arm 35 to engage it more or less remote from the center of rotation of the member 32 to vary the permissible angle of rotation to the right, that is, when rotated to produce fast freezing. When the rod 16 and the cam 61 are rotated to shift the frame 60 to the right to increase the resistance of the spring 51 and decrease the resistance of the spring 10 and produce relatively low normal refrigerating temperature, the permissible angle of rotation of the control member 32 to produce fast freezing is reduced. This operates in the first instance to decrease the effective resistance of the spring 51 on the bellows notwithstanding the increase of the pressure of the spring 51 when the control member is rotated to produce fast freezing and to increase the effective resistance of the spring 51 on the bellows when the control member 32 is rotated to produce the defrosting temperature. When a relatively high normal operating temperature is produced by adjustment of the rod 16, and a corresponding change in position is made in the cam 61 and the control member 32 is shifted to either defrosting or fast freezing positions, the changes in the effective pressures of the control member 32 on the bellows correspond to the altered differences between the normal refrigerating temperatures and the fast freezing or the defrosting temperature since thereby the pressure of the spring 51 which directly operates to resist restoration of the control member 32 when the control member is turned to the defrosting position and by increasing the angle of rotation of the control member 32 when shifted to the fast freezing position which operates to increase the effective pressure of the spring 51, in resisting restoration of the control member 32, notwithstanding the reduction of the pressure of the spring 51. Hence compensations to produce predetermined defrosting and fast freezing temperatures is accomplished by adjustment of the frame 60 which varies the pressure of the spring 51 that resists directly restoration from defrosting position and alters the limitations of the angular movement of the control member 32 which alters, as described, the effective pressure of the spring 51 in resisting restoration from the fast freezing position. The adjustment of the frame 60 corresponds to the adjustment of the control device by the user to produce the desired normal refrigerating temperature and, hence, substantially fixed defrosting and fast freezing temperatures are maintained notwithstanding variations of the normal refrigerating temperatures by the user. Automatic restoration is obtained upon the production of the predetermined fast freezing temperature in one case, or the defrosting temperature in the other case, by the operation of the pressure within the bellows that corresponds to the temperature produced by the modification of the load on the bellows.

The dial pointer 18 indicates the adjustment made to produce the normal refrigerating temperatures and the relative position of the finger 34 indicates the operating effect of the control member 32 to produce either fast freezing or defrosting. If desired, suitable legends or indicia may be placed on the cover to indicate the operative, or effective, positions of the control member 32.

I claim:

1. In a thermo-responsive switch having means for opening and closing the switch, an adjusting means for adjusting the first named means to produce operations of the switch at desired temperatures, a modifying means for modifying the operation of the first named means to selectively produce a predetermined lower switch operating temperature than that at which the said adjusting means is set and a predetermined higher temperature than the temperature at which the said adjusting means is set, regardless of the adjustment of the first named means by the adjusting means.

2. In a thermo-responsive switch having means for opening and closing the switch, an adjusting means for adjusting the first named means, means for limiting the adjustment of the first named means by the adjusting means to produce operations of the switch within a limited normal range of temperatures, modifying means for modifying the operation of the first named means to selectively produce either a predetermined lower switch opening temperature than the said normal range of temperatures or a predetermined higher switch closing temperature than the said normal range of temperatures, regardless of the adjustment of the first named means by the adjusting means.

3. In a thermo-responsive switch, a thermically operated member, a switch operating member operated by the thermically operated member, an adjusting means for adjusting the thermically operated member to produce desired switch opening and closing temperatures, a yieldingly resisting means adjusted by the adjusting means, a movable element for operatively connecting the yieldingly resisting means to the thermically operated member for resisting the closing of the switch when the element is in one position and to resist the opening of the switch when the element is in another position to produce substantially fixed switch opening and closing temperatures when the yieldingly resisting means is connected to the switch operating member, regardless of the adjustment of the thermically operated member by the adjusting means.

4. In a thermo-responsive switch having means for opening and closing the switch, an adjusting means for adjusting the first named means to produce operations of the switch at desired temperatures, a modifying means for modifying the operation of the first named means to selectively produce a predetermined lower switch operating temperature than that at which the said adjusting means is set and a predetermined higher temperature than the temperature at which the adjusting means is set, and an indicating means for indicating selected modifying operations of the modifying means.

5. In a thermo-responsive switch having means for opening and closing the switch, an adjusting means for adjusting the first named means to produce operations of the switch at desired temperatures, means for indicating the adjustment of the adjusting means, a modifying means for modifying the operation of the first named means to selectively produce a predetermined lower switch operating temperature than that at which the said adjusting means is set and a predetermined higher temperature than the temperature at which the said adjusting means is set, and an indicating means for indicating the operative relation of the modifying means to the first named means.

6. In a thermo-responsive switch having means for opening and closing the switch, an adjusting means for adjusting the first named means to produce operations of the switch at desired temperatures, a modifying means for modifying the operation of the first named means to selectively produce a lower switch operating temperature than that at which the said adjusting means is set and a higher temperature than the temperature at which the said adjusting means is set, and a compensating means for compensating the modifying means according to the adjustment of the adjusting means and opening and closing the switch by the modifying means at fixed temperatures, regardless of the adjustment of the adjusting means.

7. In a switch, a thermo-responsive pressure means for opening and closing the switch, an adjusting means for adjusting the pressure to produce operation of the switch at desired pressures, a modifying means adjusted by the adjusting means for modifying the operation of the pressure means to selectively produce either a lower switch operating pressure by the first named means than that at which the pressure means is set by the adjusting means or a higher pressure than that at which the pressure means is set by the adjusting means, and automatic means for rendering the said modifying means inoperative and for restoring the operation of the pressure means as determined by the adjustment of the adjusting means.

8. In a thermo-responsive switch, a thermic means for operating the switch to produce switch opening and closing temperature within a limited normal range, means for raising the switch closing temperature above the temperatures of the said range of temperatures, means for lowering the switch opening temperature below the temperatures of the said range, means for rendering either the second or third named means operative, and automatic means for rendering either of the second or third means inoperative on closing of the switch by the second named means or upon opening of the switch by the third named means, and means for adjusting the second and third named means for maintaining fixed opening and closing temperatures notwithstanding the variation of the temperature in the normal range of temperatures.

9. In a thermo-responsive switch, a thermic means for periodically operating the switch to open and close the switch at temperatures having a small differential, an adjusting means for producing closing and opening of the switch at desired temperatures separated by the said differential, means for modifying the operation of the first named means to extend the period during which the switch is opened to produce an increased differential, and a predetermined switch closing temperature above that at which the first named means is set by the said adjusting means and regardless of the adjustment of the adjusting means and for producing an extended period during which the switch is closed to produce a predetermined opening temperature below that at which the first named means is set and regardless of the adjustment of the adjusting means, and automatic means for rendering the said modifying means inoperative and for restoring the operation of the first named means as determined by the adjusting means.

10. In a thermo-responsive switch, a fluid pressure means for operating the switch substantially according to the temperature of a part of the fluid, an adjusting means for adjusting the pressure means to adjust the switch operating temperatures, a yieldingly resisting means adjusted by the adjusting means, a movable element for operatively connecting the yieldingly resisting means to the pressure means for raising the switch closing temperature to a predetermined temperature when located in one position and for lowering the switch opening temperature to a predetermined temperature when located in another position to produce the said predetermined temperatures regardless of the adjustment of the pressure means by the adjusting means, and an automatic means for automatically restoring the control of the switch to the said adjusting means and rendering the said resisting means inoperative upon the completion of the operation of the resistance means.

11. In a switch, a thermo-pressure member for operating a switch, an adjusting means for adjusting the thermo-pressure member, a switch operating member for opening and closing the switch and operated by the thermo-pressure member at temperatures determined by the adjustment of the adjustment means, a yieldingly resisting means adjusted by the adjusting means upon adjustment of the thermo-pressure member by the adjusting means, a movable element operative to connect the resisting means to the switch operating member for raising the switch closing temperature to a substantially fixed temperature when the element is in one connected position and to resist opening of the switch for lowering the switch opening temperature to a substantially fixed temperature when the element is in another connected position.

12. In a switch, a thermo-pressure member for operating a switch, a counteracting pressure means for counteracting the operation of the thermo-pressure member, an adjusting means for adjusting the pressure of the counteracting pressure means, a switch operating member for opening and closing the switch and operated by the thermo-pressure member at temperatures determined by the adjustment of the counteracting pressure means by the adjustment means, a yieldingly resisting means adjusted by the adjusting means according to the adjustment of the counteracting pressure means by the adjusting means, a movable element operative to connect the resisting means to the switch operating member for raising the switch closing temperature to a substantially fixed temperature when the element is in one connected position and to resist opening of the switch for lowering the switch opening temperature to a substantially fixed temperature when the element is in another connected position, the said switch operating member operative to disconnect the element therefrom upon the operation of the switch as affected by the yieldingly resisting means.

13. In a thermo-responsive switch, a thermically operated member, a switch operating member operated by the thermically operated member, an adjusting means for adjusting the thermically operated member to produce desired switch opening and closing temperatures, a yieldingly resisting means adjusted by the adjusting means, a movable element for connecting the yieldingly resisting means to the switch operating member for resisting the closing of the switch when the element is in one position and to resist the opening of the switch when the element is in another position to produce substantially fixed switch opening and closing temperatures when the yieldingly resisting means is connected to the switch operating member notwithstanding the variations of the adjustment of the thermically operated member by the adjusting means, and means for indicating the operative relation of the element and the resisting means with respect to the switch operating member.

14. In a thermo-responsive switch, a thermically operated member, a switch operating member operated by the thermically operated member, an adjusting means for adjusting the thermically operated member to produce desired switch opening and closing temperatures, means for indicating the adjustment of the adjusting means, a yieldingly resisting means adjusted by the adjusting means, a movable element for connecting the yieldingly resisting means to the switch operating member for resisting the closing of the switch when the element is in one position and to resist the opening of the switch when the element is in another position to produce substantially fixed opening and closing temperatures when the yieldingly resisting means is connected to the switch operating member, regardless of the adjustment of the thermically operated member by the adjusting means, and means for indicating the operative relation of the element and the resisting means with respect to the switch operating member.

15. In a thermo-responsive switch, a thermically operated member, a switch operating member operated by the thermically operated member, an adjusting means for adjusting the thermically operated member to produce desired switch opening and closing temperatures, a yieldingly resisting means, a movable element for connecting the yieldingly resisting means to the switch operating member for resisting closing of the switch when the element is in one position and to resist opening of the switch when the element is in another position, a compensating means adjusted by the adjusting means for producing substantially fixed switch opening and closing temperatures when the yieldingly resisting means is connected to the switch operating member, regardless of the adjustment of the thermically operated member by the adjusting means.

ESTEL C. RANEY.